United States Patent
Bakholdin et al.

(10) Patent No.: US 10,693,342 B2
(45) Date of Patent: Jun. 23, 2020

(54) CONTAINING A FIELD OF FLYWHEEL ENERGY STORAGE UNITS

(71) Applicant: Amber Kinetics, Inc., Union City, CA (US)

(72) Inventors: Daniel Bakholdin, Newbury Park, CA (US); Seth R. Sanders, Berkeley, CA (US); Edward Young Chiao, San Jose, CA (US); Mark S. Stout, San Leandro, CA (US); Matthew K. Senesky, Berkeley, CA (US); Matthew Brandon Garten, Mountain View, CA (US); Mark J. Holloway, Mountain View, CA (US)

(73) Assignee: Amber Kinetics, Inc., Union City, CA (US)

( * ) Notice: Subject to any disclaimer, the term of this patent is extended or adjusted under 35 U.S.C. 154(b) by 342 days.

(21) Appl. No.: 15/583,864

(22) Filed: May 1, 2017

(65) Prior Publication Data

US 2017/0317553 A1 Nov. 2, 2017

Related U.S. Application Data

(60) Provisional application No. 62/330,838, filed on May 2, 2016.

(51) Int. Cl.
*H02K 7/02* (2006.01)
*F16F 15/315* (2006.01)

(52) U.S. Cl.
CPC .......... *H02K 7/025* (2013.01); *F16F 15/315* (2013.01); *H02K 2213/12* (2013.01); *Y02E 60/16* (2013.01)

(58) Field of Classification Search
CPC ................................ H02K 7/025; Y02E 60/16
See application file for complete search history.

(56) References Cited

U.S. PATENT DOCUMENTS

| 3,151,416 | A | 10/1964 | Eakin et al. | |
| 7,034,420 | B2 * | 4/2006 | Brackett | H02K 7/025 310/74 |

(Continued)

FOREIGN PATENT DOCUMENTS

| FR | 2485702 A1 | 12/1981 |
| GB | 1317330 A | 5/1973 |
| WO | WO 2015/185510 A1 | 12/2015 |

OTHER PUBLICATIONS

PCT International Search Report and Written Opinion for PCT/US2017/030453, dated Jul. 19, 2017, 11 Pages.

(Continued)

*Primary Examiner* — Quyen P Leung
*Assistant Examiner* — Minki Chang
(74) *Attorney, Agent, or Firm* — Soquel Group LLC

(57) ABSTRACT

A number of flywheel units are arranged in a geometric pattern. Each of the flywheel units is enclosed in a containment unit. The containment unit includes a cylindrical tube, a cover, a bottom support, resting on the ground, on which the containment unit is mounted, and a fill medium surrounding each containment unit. The containment unit may also include a horizontal plate, mounted to the base of tube, which extends outward or radially from the base of tube a pre-determined length. In this case, the fill medium rests directly on top of the portion of the plate that extends outward from tube.

19 Claims, 7 Drawing Sheets

(56) References Cited

U.S. PATENT DOCUMENTS

| | | | |
|---|---|---|---|
| 9,325,217 B2 * | 4/2016 | Veltri | F16C 32/0417 |
| 2004/0025625 A1 | 2/2004 | Griswold et al. | |
| 2009/0294096 A1 * | 12/2009 | Mills | F28D 20/0043 |
| | | | 165/45 |
| 2011/0226760 A1 | 9/2011 | Bell et al. | |
| 2011/0226780 A1 * | 9/2011 | Bell | F28D 20/0034 |
| | | | 220/565 |
| 2015/0162799 A1 * | 6/2015 | Ilan | H02K 7/025 |
| | | | 310/74 |
| 2017/0093247 A1 * | 3/2017 | Spinner | F03G 3/08 |
| 2018/0287456 A1 * | 10/2018 | Winter | H02K 5/04 |

OTHER PUBLICATIONS http://beaconpower.com/wp-content/uploads/2014/03/modular_design_720x560px_v2.jpg Mar. 27, 2014.†
http://beaconpower.com/wp-content/uploads/2014/03/bp_flywheel_foundation.jpg Mar. 19, 2014.†
http://beaconpower.com/system-installation/ Aug. 2014.†
http://beaconpower.com/system-safety/ Aug. 2014.†

\* cited by examiner
† cited by third party

CONTAINING A FIELD OF FLYWHEEL ENERGY STORAGE UNITS

CROSS REFERENCE TO RELATED APPLICATIONS

This application claims the benefit of priority under 35 U.S.C. § 119(e) to U.S. Provisional Application No. 62/330,838, filed on May 2, 2016, which is incorporated herein by reference in its entirety for all purposes.

TECHNICAL FIELD

This description generally relates to energy storage, and particularly to the design of a system for containing a field of flywheel energy storage units.

BACKGROUND

Description of the Related Art

Many energy sources, particularly clean energy sources such as wind turbines and solar panels, generate energy that does not temporally match the load experienced. In much of the developed world, energy generation follows experienced load, such that energy is provided as needed. Under circumstances of high load, techniques such as the use of peaker generators and automatic generation control (AGC) on thermal generators allow for generation that matches high and variable load. However, despite the availability of such techniques, there are often instances where energy storage is important for meeting energy load.

Currently existing energy storage systems all have drawbacks of one form of another. Size, price, storage efficiency, efficacy, and safety are all concerns when designing an energy storage system. Generally, smaller size, lower price, reduced loss in both inputting energy for storage and extracting it for distribution, reduced losses for continuous operation, and safe disposal are all preferred characteristics of energy storage systems.

A flywheel mechanism that incorporates a rotor is one type of energy storage system that stores energy as rotational kinetic energy. A flywheel rotor is a weighted, rotationally symmetric mass that spins while physically coupled, directly or indirectly, to a motor/alternator that itself is electrically coupled to a converter, such as a back-to-back inverter system, constituting an AC-AC conversion subsystem. When power is received for storage, the rotor is driven increasing the rotational speed of the flywheel rotor. When power is to be extracted, the flywheel rotor drives the motor/alternator. The faster a flywheel rotor can spin, the more energy it can store. The amount of energy that can be stored in a flywheel rotor depends on a combination of the rotor's mass, strength properties, cyclic fatigue properties, and shape among other factors. Generally, a flywheel's bearing and suspension subsystem is designed to minimized energy losses due to friction, heat, and other loss sources.

Given their physical size, mass and the amount of energy stored in rotational form, concerns regarding flywheels include space and safety considerations. It is with respect to these considerations and others that the present invention has been made.

SUMMARY

In order to store the amount of energy required in utility-grade energy storage applications a number of flywheel energy storage units may be deployed. For spatial efficiency these flywheel energy storage units are placed near to each other within a spatial area, referred to herein as a field.

Generally, the handling of any kind of failure state for a flywheel is important. One consideration in the design of a flywheel energy storage field installation layout is the containment of fragments in case of an unintended rotor burst. Another consideration is safe management of a loose intact energized (rotating) rotor or of a loose intact energized (rotating) locked rotor-housing system. These safety considerations are layered on top of need to provision electrical and signal interconnects, and in some cases vacuum plumbing interconnects.

This description provides embodiments of field installation designs that address at least these considerations, among others.

Certain embodiments use containerized systems, where individual flywheel units are co-packaged together into a standard shipping container. An embodiment of a field installation design for an array of containers is provided.

Other aspects concern the geometric layout of the flywheel units within a field. In certain embodiments the geometric layout is a honeycomb array in which adjacent flywheel units are equidistant.

In certain embodiments, flywheel units are each enclosed by a flywheel containment unit. In these embodiments, a system for containing a field of flywheel units is disclosed that includes a number of flywheel units arranged in a geometric pattern, in which a flywheel unit includes a flywheel rotor and a combined motor and alternator, referred to herein as a motor/alternator, coupled to the flywheel rotor, and where the axial center of each pair of adjacent flywheel units is substantially equidistant, a containment unit that encloses a corresponding flywheel unit. The containment unit includes a cylindrical tube, a cover, a bottom support, resting on the ground, onto which the containment unit mounts, and a fill medium surrounding each containment unit.

In certain embodiments, the aforementioned containment unit includes a horizontal plate, mounted to the base of tube, which extends outward or radially from the base of tube a pre-determined length. The fill medium rests directly on top of the portion of the plate that extends outward from tube.

In yet other embodiments, a heavy base plate is attached, at the factory, to the bottom of containment unit in order to reduce installation costs.

This description further discloses embodiments of a device for containing a flywheel unit that includes a cylindrical tube, which encloses the flywheel unit, a cover, attached to the top of the cylindrical tube; and a bottom plate, attached to the bottom of the tube, to which the flywheel unit mounts.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG.) 1 is a block diagram of a flywheel energy storage system according to one embodiment.

Figure 1:
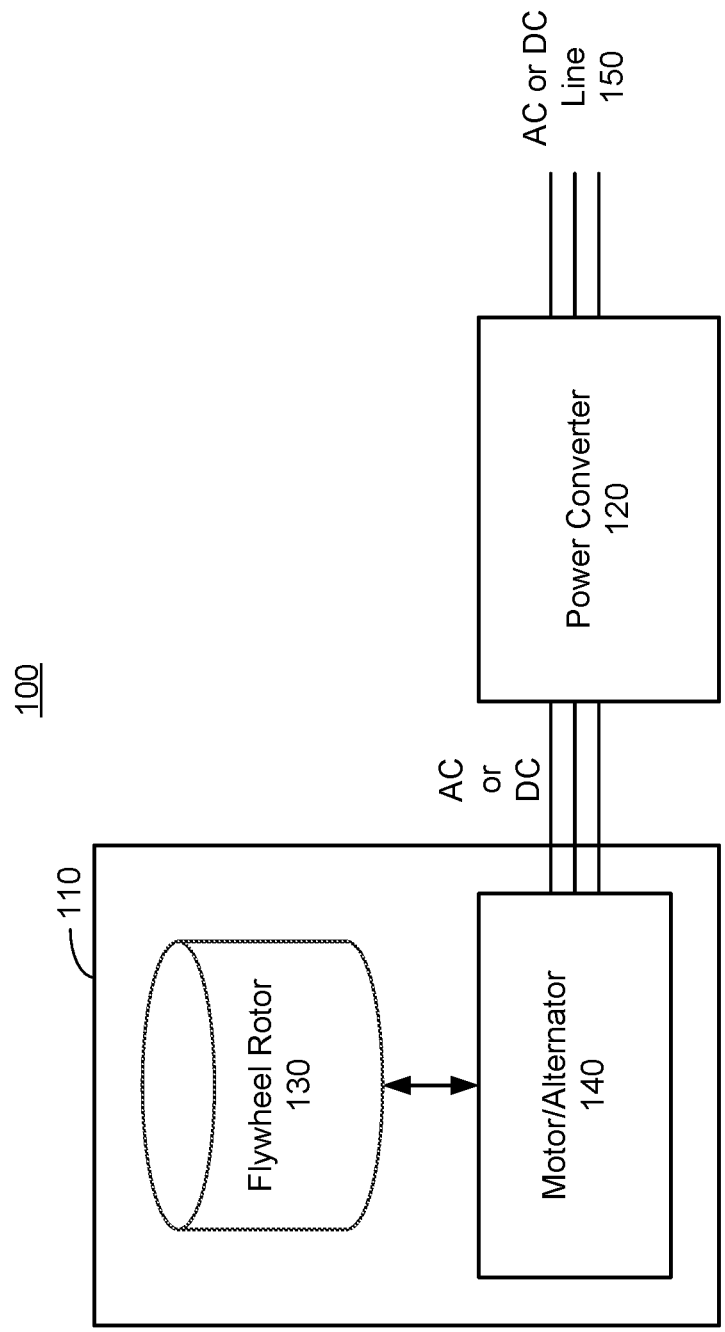

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A system is described for containing a field of flywheel energy storage units. The system is generally independent of the technical specifics of the flywheel energy storage units, also referred to as simply flywheel units, that are contained. Thus, the system may be used with a wide range of flywheel units. More generally, the system may be used to contain other devices and may be useful, specifically, for devices that include heavy moving parts that are subject to rupture, explosion or other catastrophic failure. This may include other energy storage devices such as batteries, capacitors, pneumatic devices, or other devices that can suffer catastrophic failures.

Flywheel Energy Storage System

Figure (FIG.) 1 is a block diagram of a flywheel energy storage system 100, also referred to as flywheel system 100, according to one embodiment. Flywheel system 100 includes a flywheel mechanism or device 130 or simply flywheel 130, which includes a flywheel rotor 130, a motor/alternator 140, a housing 110, a power converter 120, and a power line 150, which may be AC or DC. For example, power line 150 may be a conventional three-phase 60 Hz AC line. In certain embodiments, power converter 120 converts the input alternating current into an alternating current acceptable to the motor/alternator 140. Alternatively, in other embodiments, converter 120 converts the alternating current from the motor/alternator 140 into a direct current output. Motor/alternator 140 converts between electrical and mechanical energy, so that energy can be stored in or drawn from the flywheel 130. Motor/alternator 120 combines the function of a motor and an alternator. Motor/alternator 140 couples to flywheel 130 either directly, for example using a shaft, or indirectly, for example using a stub shaft that connects to a bearing. The motor/alternator 140 is coupled to the remainder of flywheel system 100 via wires or other electrical couplings.

Although housing 110 is shown as housing or enclosing a single flywheel rotor 130 and a single motor/alternator 140 in other embodiments a single housing may enclose multiple rotors and motor/alternators. A housing may also enclose one or more power converters. Generally, hereinbelow, the term flywheel energy storage unit, flywheel storage unit, flywheel unit, or simply unit refers to a single housing 110 and any rotors, motor/alternators and power converters that it houses or encloses, or to which they are mounted.

Containing a Field of Flywheel Energy Storage Units

Several embodiments of systems that contain a plurality of flywheel energy storage units are described hereinbelow.

I. Containerized Layout Embodiments

Certain embodiments rely on containerized systems, where individual flywheel units are co-packaged together into a standard shipping container. Embodiments typically include 2 to 10 flywheel units installed within a standard 40 foot shipping container. Other similar configurations may use 20 foot shipping containers, for example, or other standard container sizes. An installation may include a single container or multiple containers.

The shipping container approach affords a convenient method for shipping a subgroup of flywheels to a customer installation site, with electrical and signal wiring pre-installed at the factory. Additional vacuum and forced air moving apparatus would also be pre-installed at the factory. Further, the shipping container provides a convenient weather and sun shielding enclosure. Each shipping container, together with any flywheel storage units that it encloses is referred to hereinbelow as an "energy block".

In order to provide a degree of safety against rotor burst, each container may be installed below grade at the field installation site. A fill material, referred to as a fragment containment medium, may be packed between adjacent containers.

Figure 2A:
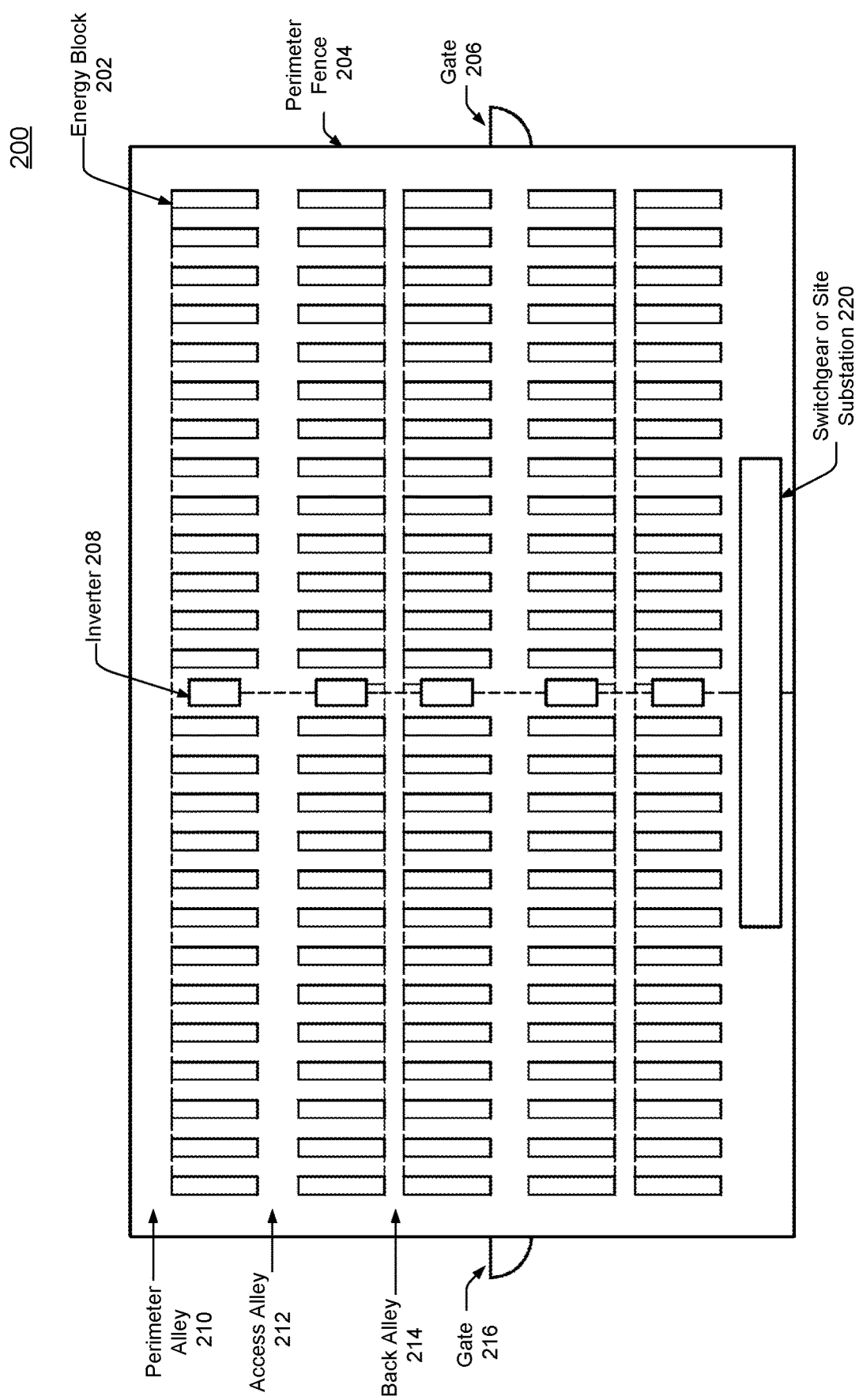
FIGS. 2A-C illustrate a representative embodiment of a field installation design for an array of containers.
Figure 2B:
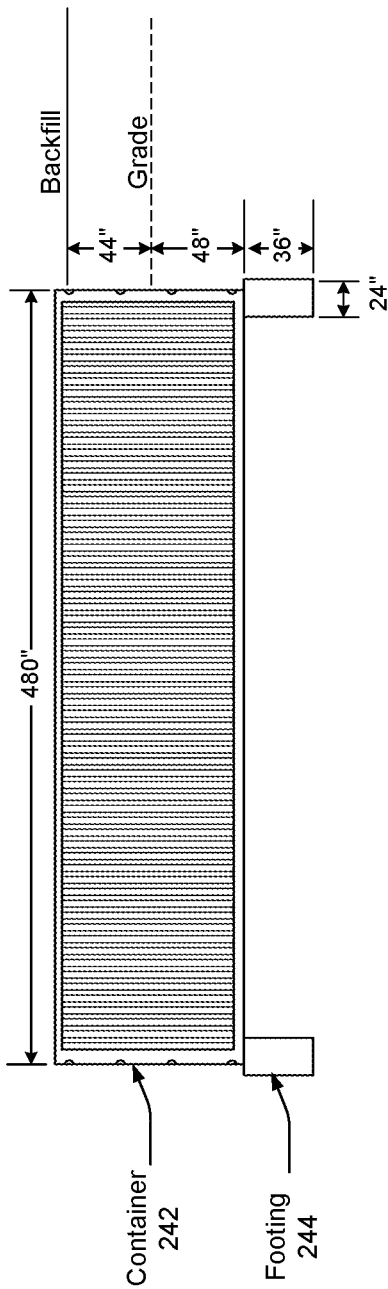
Figure 2C:
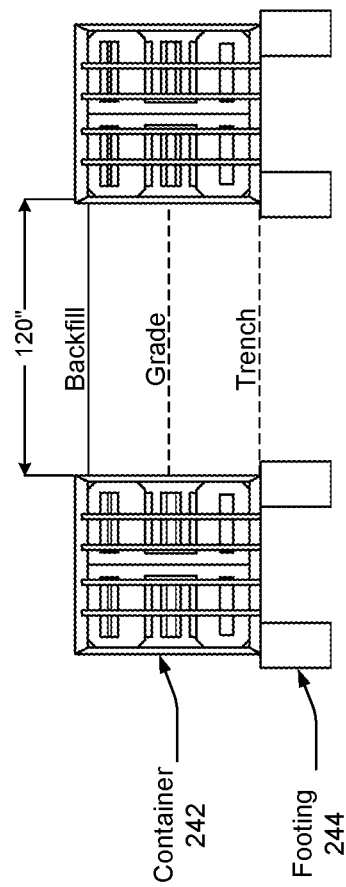

One representative embodiment of a field installation 200 for an array of containers is illustrated in FIGS. 2A-C. Field installation 200 includes five rows of energy blocks 202, where a single energy block is a container that includes a number of flywheel units. Field installation 200 includes 26 energy blocks per row and each energy block is electrically connected to a 2 MW inverter 208. Each energy block is a standard 40' long×8' wide×8' high shipping container. There is an alley at the front and back of each row of energy blocks 202. There are two perimeter alleys 210, two access alleys 212 and two back alleys 214. In one embodiment, perimeter alley 210 is 20' wide, access alleys 212 are 18' wide and back alleys are 10' wide. The overall field installation 200 is then 516' long and 298' wide. A perimeter fence 204 encloses field installation 200 and two gates 206 provide access for entry and exit. Additionally, there is a site substation or switchgear 220 for the installation that provides electrical power supply and collection to field installation 200.

FIGS. 2B and 2C illustrate an embodiment in which containers 242 are partially buried. The a real density of the energy block containers in field installation 200 is about 50%. As such, by excavating to a depth of about 4 feet, or half the height of each container, the excavated soil can be used as backfill in between energy block containers to provide a full 8 foot tall barrier between energy blocks. As illustrated in FIG. 2B, the soil beneath container 242 is excavated approximately 48" (4'), and is mounted on four footings 244. In this embodiment, footing 244 is a concrete block 36" high and 24" wide. The excavated soil is built up around container 242 approximately 44" leaving top access to the container cover. FIG. 2C shows a side view of two adjacent containers 242, mounted on footings 244, separated by a 120" (10') alley.

An alternative arrangement is to place the containers above grade, and to fill the interstitial spaces between containers with fragment containing medium such as soil, sand, crushed rock, gravel, or a combination of any of the aforementioned media. Hereinbelow, the term gravel is used to encompass any type of aggregation of small rock or pebble even if it includes a portion of sand or other material.

In general, the density of the fill material, which may also be referred to as the fragment containing medium, is an important parameter in arresting fragment energy in case of rotor burst. Thus, gravel of highest density is preferred, with sand another good choice, followed by soil. A second important property is the soil bearing capacity of the fill material, i.e. its ability to withstand pressure. Generally, gravel is rated as having the highest soil bearing capacity with sand, clay and dense soils having acceptable bearing capacities. Finally, under water saturation, soil loses much of its containment function, and so gravel that readily allows water to drain is preferred. Gravel is available throughout much of the world at low cost.

This arrangement provides protection of neighboring containers against fragment penetration in case of single or multiple rotor bursts within a given container. However, there remains the risk of loss of all flywheel units within a container given a single rotor burst. However, with adequate surrounding containment, the installation does provide protection of personnel on the periphery of the installation. Further, loss of service of a single container within a field installation of many containers may be fully tolerated and taken into consideration in the field design process.

II. Geometric Layout Embodiments

In another approach to field layout individual flywheel units are separated and placed at specific locations, conforming to a geometric pattern, to form an array or sub-array within an area. The principal characteristic of a geometric layout is that the distance between the axial centers of adjacent flywheel units are equal. A hexagonal or "honeycomb" array pattern affords maximal density packing in a single plane with uniform spacing. A regular array with units placed on uniform orthogonal grid lines (a square grid layout) is another possible example, although packing density will be somewhat inferior to that of the hexagonal honeycomb scheme.

In certain embodiments, a group or sub-array of flywheel units may be placed in a geometric pattern with adjacent flywheels being equidistant and at a distance from other sub-arrays, leaving enough space for a vehicle that would be used for service and installation.

In certain embodiments, adjacent flywheel units are separated with fragment arresting material such as gravel, i.e. the fragment arresting material is filled in between individual units. Individual units maintain a safe prescribed spacing from neighboring units.

Figure 3:
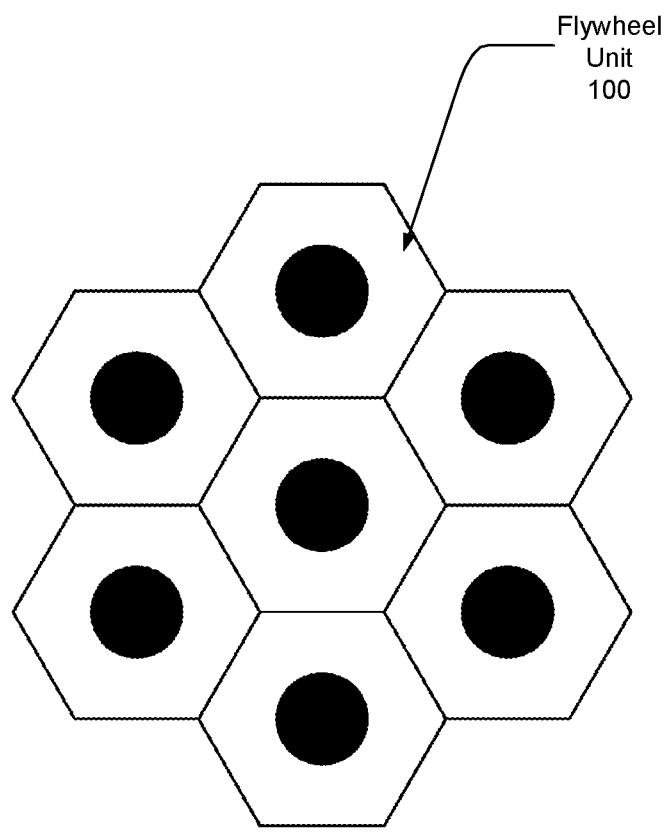
FIG. 3 illustrates one embodiment of a honeycomb array in which the location of each flywheel unit is represented as a circle.

FIG. 3 illustrates one embodiment of a honeycomb array 300 in which the location of each flywheel unit 310 is represented as a circle. The centerpoint of each circle is the axial center of the respective flywheel unit 310. While FIG. 3 depicts 7 adjacent flywheel units, the design is extensible and can accommodate any number of adjacent units. The solid lines forming the hexagonal boundaries are shown for illustrative purposes as there may not be a physical demarcation between contiguous hexagonal areas. Although in certain embodiments there may be physical barriers between adjacent units, this is not required. Generally, adjacent units are isolated with adequate fragment arresting material to guarantee continued operation of a unit in case of a burst failure of any of its nearest neighbors.

Figure 4:
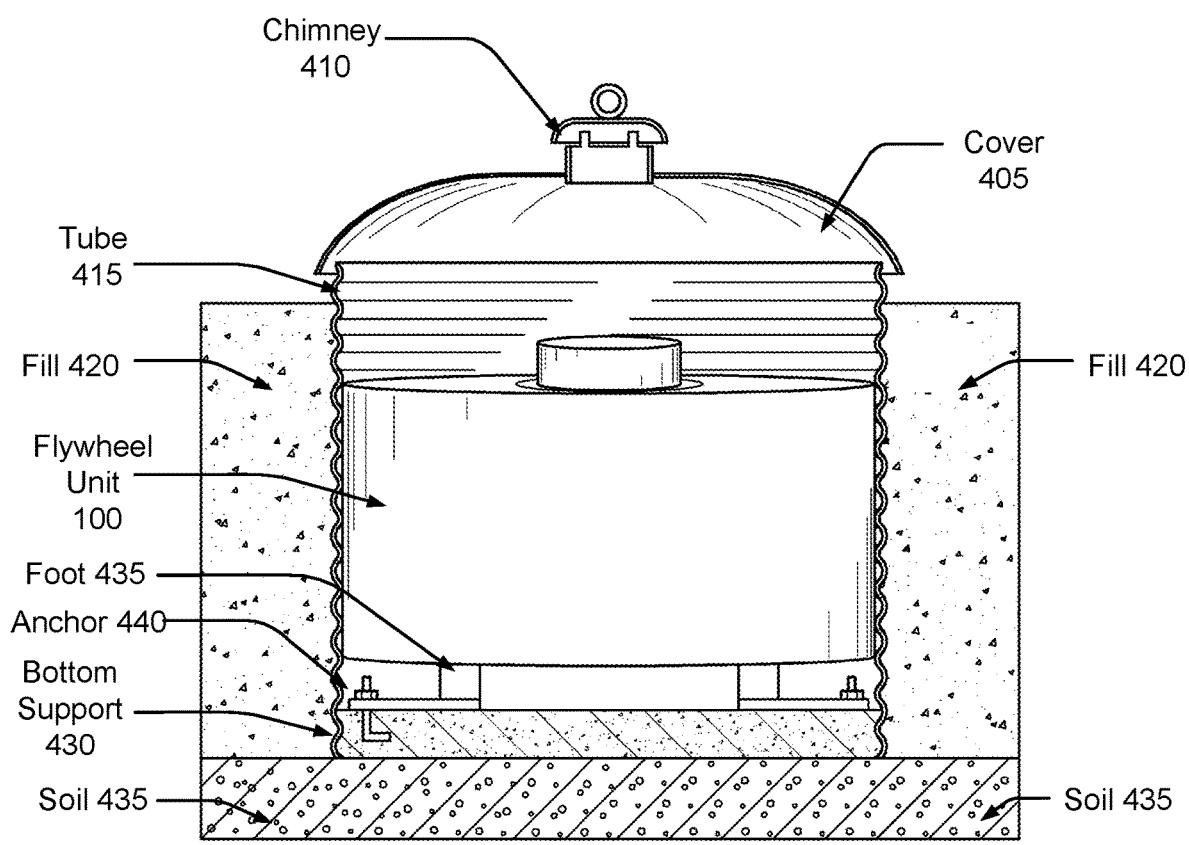
FIG. 4 depicts a cross-section view of an embodiment of a flywheel containment unit that encloses a flywheel unit.

FIG. 4 depicts a cross-section view of a flywheel containment unit 400 that encloses a single flywheel unit 100. Containment unit 400 includes an isolating tube 415 surrounding flywheel unit 110 that separates it from a fill 420, and a cover 405. In certain embodiments, cover 405 includes a passive chimney 410. Cover 405 attaches to tube 415. In certain embodiments, containment unit 405 is placed on top off a bottom support 430. In such cases, flywheel unit 100 is typically anchored to bottom support 430 using bolts or the like.

Bottom support 430 is typically concrete which is poured into the bottom of tube 415 prior to installing flywheel 100. This approach has the advantage that tube 415 serves as the form for bottom support 430; no other form is necessary.

Tube 415 provides a simple protective barrier to increase longevity of the unit housing in view of potential corrosion. Importantly, it allows for backfill of fill 420, which is a fragment arresting medium, before flywheel unit 100 is installed. Without tube 415, the arresting media would flow over the bottom support, impeding subsequent installation or removal. The tubes may be fabricated from sections of culvert ducts, readily available on the world market. An advantage of culvert duct is that it is typically fabricated from galvanized corrugated steel, and is rated for many decades of outdoor service, especially while handling ground water. Service life can be further improved by applying aluminum, asphalt and polymer-laminated coatings. Culvert duct is also referred to as corrugated steel pipe, corrugated pipe culvert and corrugated metal pipe. However, tube 415 does not have to be corrugated and can be made from a variety of materials including steel, plastic, fiberglass, or a composite material such as a metal, plastic or ceramic composite.

As illustrated in FIG. 4, in certain embodiments flywheel unit 100 has plurality of feet 435, each of which connects via an anchor 440 to bottom support 430. Bottom support 430 rests on soil 435 which may be the pre-existing, in situ, soil. Alternatively, soil 435 may be compacted or conditioned in some way.

Cover 405 shields the unit from direct solar radiation and from inclement weather. In certain embodiments, it incorporates passive chimney 410 to enhance convective cooling of the flywheel unit. It should be noted that cooling loads are quite minimal with an efficient flywheel design. This protective cover is engineered to have adequate strength and resilience to arrest axial-directed fragments of non-rotating components of flywheel unit 100, such as electronic parts, a bearing cap, etc., resulting from a burst or other failure. Note that it is anticipated that in the event of a rotor burst, rotor fragments would emanate radially and not axially.

To provide the needed fragment arresting material, flywheel units, each housed in a respective containment unit 400, may be installed below grade and rely on in situ soil 435. Alternatively, the flywheel units may be installed above grade with the fragment arresting material backfilled around the units. Or the flywheel units may be installed partially below and partially above grade with the fragment arresting material backfilled around the units.

In cases where the flywheels are arranged in a hexagonal array, the hexagonal pattern affords three directions of linear continuous pathway for direct line of sight installation of electrical power and signal cabling. These directions are mutually offset in angular direction, from one another, within the plane of the installation by 120 degrees. Power and data connection lines may be run in a geometric linear manner along these direct axes, or in one of many other schemes. One example scheme is to cluster units into natural hexagonal subclusters of 7 or 19 units for purposes of power and signal aggregation. The subclusters would then feature aggregated power and signaling, routed together to centralized inverters and hardware control centers.

The three direct straight line axes provide convenient pathways for moving a gantry crane or fork lift, for installation or removal of flywheel units.

It is important to note that a fragment resulting from a rotor burst does not actually need to be brought to rest before impacting the housing of a neighboring unit to avoid catastrophic damage. Rather, a rotor burst fragment needs to be adequately decelerated so that upon impacting a neighboring unit, the housing is only impacted in a negligible way. Perforation velocities for a representative one-inch thick mild steel housing have been computed to be in the range of hundreds of m/s.

Although not depicted, containment unit 400 includes electrical connections for power and signal cables. Cable access to flywheel unit 100, through tube 415, can be by any one of a number of methods, including but not limited to, conduit bulkhead fittings, grommeted penetration holes, or simply by way of conduit formed to pass through a ventilation gap formed between cover 405 and tube 415.

II. 1 Capture of Secondary Axial Fragments

Figure 5:
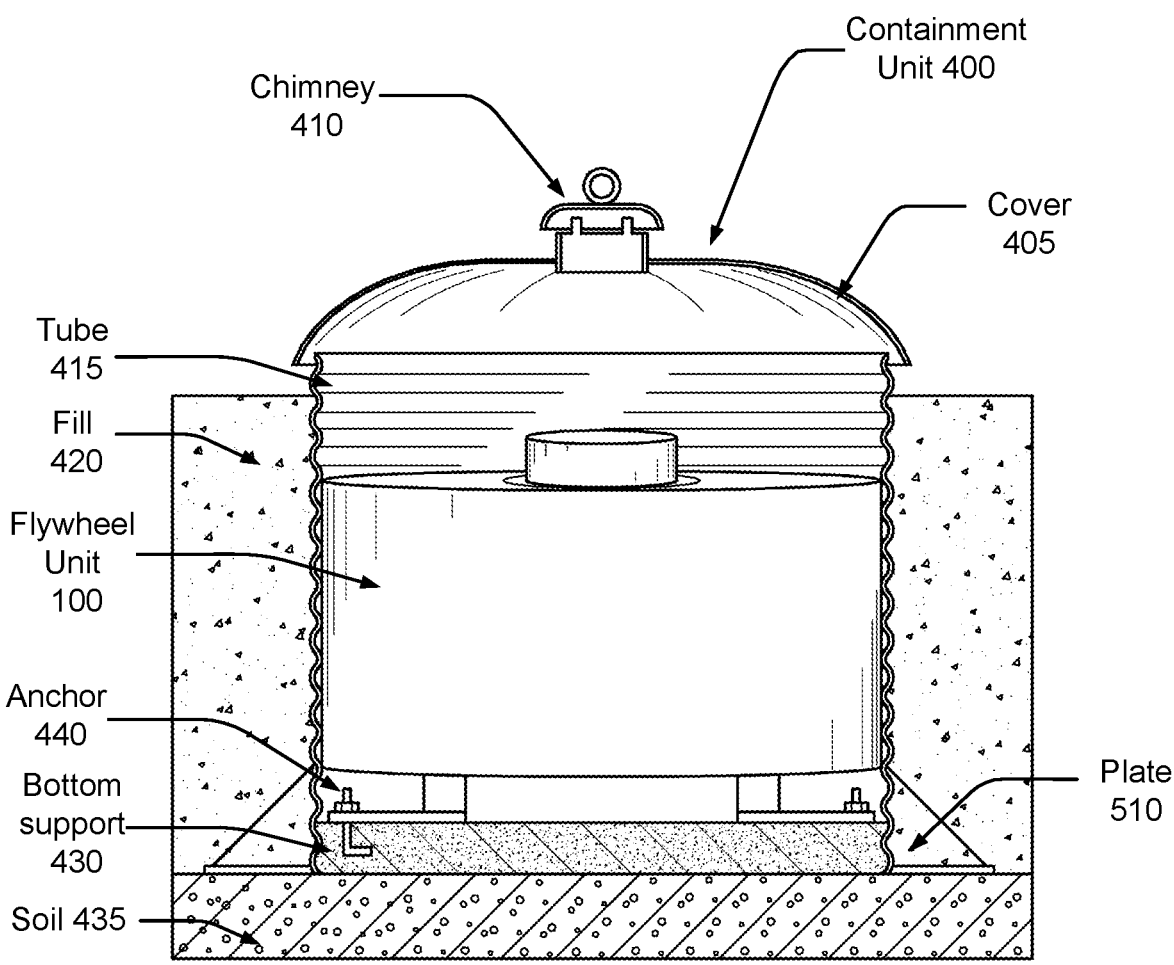
FIG. 5 depicts an embodiment of a flywheel containment unit that utilizes a horizontal plate to limit the damage that may occur in the event of a burst or other failure.

FIG. 5 depicts an embodiment of a flywheel containment unit 500 that utilizes a horizontal plate 510, mounted to the bottom of tube 415, to limit the damage that may occur in the event of a burst or other failure. Essentially, containment unit 500 is an embodiment of containment unit 400 that adds plate 510. Plate 510 extends outward or radially from the base of tube 415 a pre-determined length, e.g. 3" to 2'. Fill 420 thus rests directly on top of plate 510. Thus, in the event of a failure the force from the vertical impact of a secondary fragment into cover 405 must lift a portion of the mass of fill 420 in addition to the combined mass of flywheel unit 100 and containment unit 400. Plate 510 may be welded to the bottom of tube 415 or mounted using other mechanisms. Plate 510 can be a circular shape placed beneath tube 415; alternatively, it can have a circular cutout region the diameter of tube 415 such that it is in the shape of a washer that attaches to and extends outward from tube 415.

Thus, fill 420, which is used for radial/horizontal flywheel containment, is also utilized to arrest the upward motion of the secondary fragments or components. By forcing the upward motion of these vertically accelerated components to lift a predetermined mass of fill 420, the upward motion of cover 405 is limited to a corresponding predetermined height.

Thus, the lifting of the combined mass of cover 405 and fill 420, along with shear forces within the fragment arresting media, effectively absorb the kinetic energy of the secondary fragment. This energy transfer into work prevents cover 405 as well as fragments from flywheel unit 100 from being blasted into the air. Utilizing the mass of fill 420 avoids the need for a more massive protective cover.

III. Delivery and Installation in Pre-Assembled Containment Units

Higher field labor rates in certain regions can result in prohibitive installation costs. The process of moving and placing soil or aggregate, and the additional concrete and rebar requirements, results in higher installation costs than in the previously mentioned installation techniques. In regions of high labor costs, it becomes advantageous to perform certain tasks at the factory, in order to reduce the amount of labor required to install flywheel units in the field.

Specifically, the labor associated with the movement and placement of soil can be reduced by using a large auger to bore holes in the field that are only slightly larger than the flywheel containment unit to be placed in the hole. The machinery used is very effective and holes large enough to accommodate a flywheel assembly are bored in a matter of minutes. Such bored holes can be utilized regardless of the hole placement pattern. Holes can be bored in the honeycomb or other patterns in order to minimize a real footprint, wiring, and labor. Holes may be formed using any method and equipment; thus, forming of the holes is not limited to the use of an auger.

Figure 6:
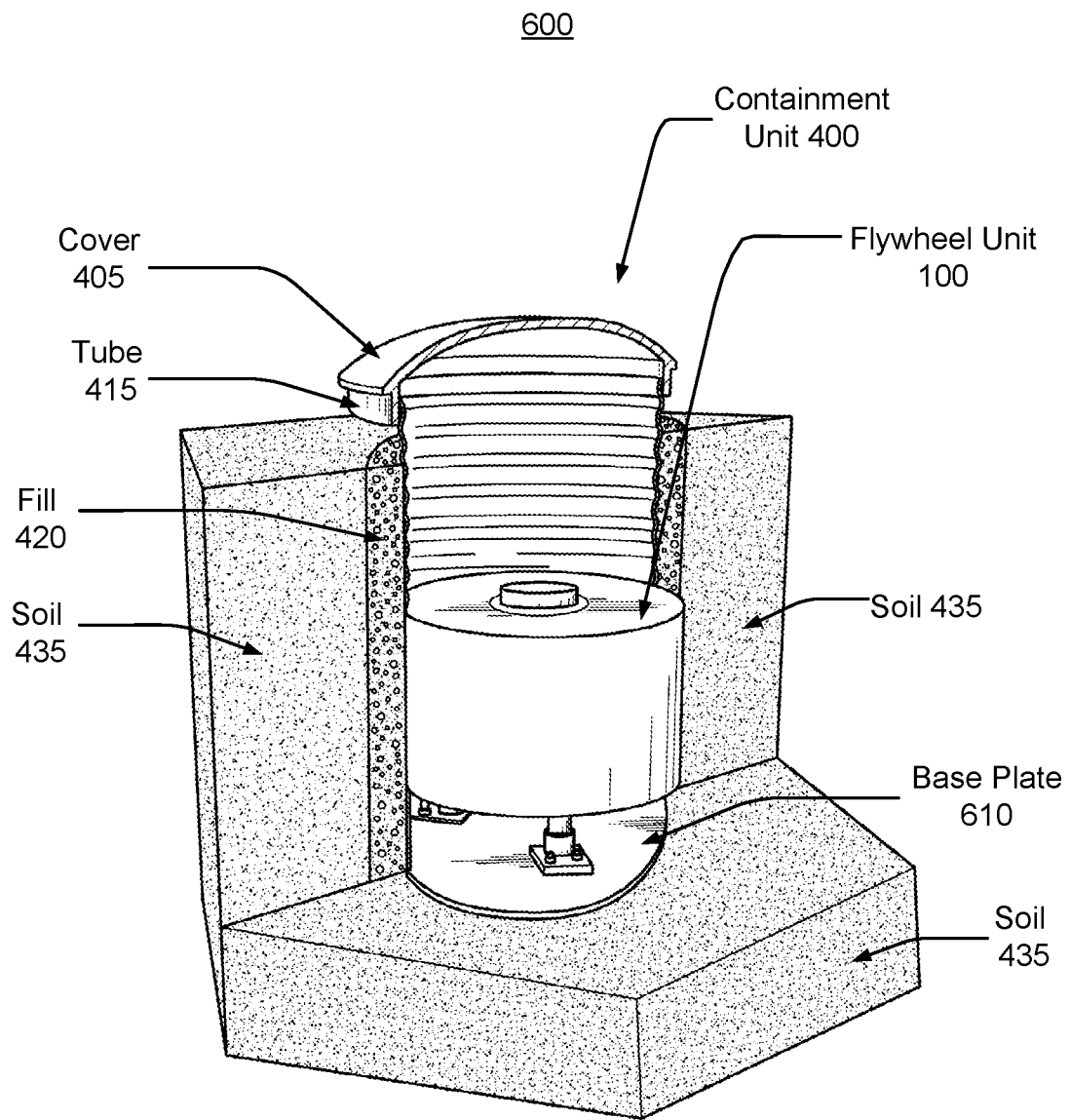
FIG. 6 illustrates an embodiment of a flywheel containment unit where a heavy base plate is attached, at the factory, to the bottom of the containment unit in order to simplify installation.

FIG. 6 illustrates an embodiment of a containment unit 600 for a flywheel where a base plate 610 is attached, at the factory, to the bottom of a containment unit, such as containment unit 400, in order to reduce installation costs. Essentially, containment unit 600 is an embodiment of containment unit 400 in which base plate 610 serves as bottom support 430. In order to eliminate the labor associated with embodiments where bottom support 430 is a concrete or cement foundation, and the labor associated with placing and securing containment unit 400 to that foundation, base plate 610 is attached to tube 415 at the factory. Thus, by forming a water-tight seal between base plate 610 and containment unit 600, by welding for instance, and providing appropriate corrosion resistant treatment, containment unit 600 becomes a "capsule" assembly that can be placed directly into a hole in the earth. In this certain embodiments, base plate 610 rests on soil 435. In certain embodiments, after placing containment unit 600 into a bored hole, the hole is filled with fill 420. In other embodiments, containment unit 400 fits snugly inside the bored hole and no fill 420 is required.

Base plate 610 is mounted at the factory and containment unit 600 can be delivered to the field, ready to be placed in the auger bored hole. This further reduces shipping and installation costs.

Additional Configuration Considerations

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for containing a field of flywheel units, comprising:
    a plurality of flywheel units, wherein a flywheel unit includes a flywheel rotor, a motor/alternator coupled to the flywheel rotor, and a housing that encloses the flywheel rotor and the motor/alternator;
    a plurality of base plates, wherein each flywheel unit is fixedly attached at a bottom end to a base plate;
    a plurality of containment units, each containment unit enclosing a corresponding flywheel unit, wherein each containment unit comprises a cylindrical tube, which surrounds the corresponding flywheel unit, and a cover attached to the tube, wherein the cylindrical tube is a section of pipe culvert, and wherein each containment unit and its corresponding flywheel unit is disposed in a substantially cylindrical hole in the ground, wherein the base plate rests on the ground at the bottom of the hole; and
    a fragment containing medium that surrounds each containment unit substantially filling a gap between the containment unit and the inside surface of the hole.

2. The system of claim 1, wherein each flywheel unit has a plurality of feet and each foot attaches at one end to the bottom of the housing and at the other end is anchored fixedly to the base plate.

3. The system of claim 1, wherein the fragment containing medium is selected from the group consisting of gravel, sand and soil.

4. The system of claim 1, wherein the wherein the base plate is made of steel, plastic, or a composite.

5. The system of claim 1, wherein the cover includes a passive chimney.

6. The system of claim 1, wherein the tube is made from corrugated steel pipe.

7. The system of claim 1, wherein the tube is made of steel, or plastic pipe.

8. The system of claim 1, wherein the fragment containing medium is selected from the group consisting of soil, sand, crushed rock, and gravel.

9. The system of claim 1, wherein the field of flywheel units further comprises clusters of flywheel units, and wherein each flywheel unit in a cluster is electrically connected to a shared inverter and hardware control center.

10. The system of claim 1, wherein each of the flywheel units and their corresponding containment units is placed below grade.

11. The system of claim 1 wherein the plurality of flywheel units are arranged in a geometric pattern.

12. The system of claim 11, wherein the geometric pattern is a honeycomb array that includes at least seven flywheel units, and wherein the axial center of each pair of adjacent flywheel units is substantially equidistant.

13. The system of claim 11, wherein the geometric pattern is a rectangular grid wherein flywheel units are placed on uniform orthogonal grid lines.

14. A device for containing a flywheel unit, comprising:
a cylindrical tube, which encloses a flywheel unit, wherein the cylindrical tube is a section of pipe culvert;
a cover, attached to the top of the cylindrical tube; and
a base plate, attached to the bottom of the tube, to which the flywheel unit mounts, wherein a flywheel unit includes a flywheel rotor, a motor/alternator coupled to the flywheel rotor, and a housing that encloses the flywheel rotor and the motor/alternator, wherein the housing fixedly mounts to the base plate.

15. The device of claim 14, wherein the flywheel unit has one or more feet and each of the one or more feet is anchored to the base plate.

16. The device of claim 14, wherein the base plate is made of steel, plastic, or a composite.

17. The device of claim 14, wherein the cover includes a passive chimney.

18. The device of claim 14, wherein the tube is made from corrugated steel pipe.

19. The device of claim 14, wherein the tube is made of steel, or plastic pipe.

* * * * *